United States Patent [19]

Domesle et al.

[11] Patent Number: 4,828,807
[45] Date of Patent: May 9, 1989

[54] METHOD FOR THE PURIFICATION OF EXHAUST GAS FROM DIESEL MOTORS

[76] Inventors: Rainer Domesle, Wingertstr. 202, 6457 Maintal; Bernd Engler, Vosswaldstr. 3, 6450 Hanau 9; Edgar Koberstein, Wolfskernstr. 8, 8755 Alzenau; Herbert Völker, Bogenstr. 43, 6450 Hanau 11, all of Fed. Rep. of Germany

[21] Appl. No.: 147,603

[22] Filed: Jan. 22, 1988

Related U.S. Application Data

[60] Continuation of Ser. No. 914,416, Oct. 2, 1986, abandoned, which is a division of Ser. No. 703,005, Feb. 19, 1985, abandoned.

[30] Foreign Application Priority Data

Feb. 28, 1984 [DE] Fed. Rep. of Germany ....... 3407172

[51] Int. Cl.[4] .............................................. B01D 53/36
[52] U.S. Cl. .............................. 423/213.7; 423/215.5
[58] Field of Search .......................... 423/213.7, 215.5

[56] References Cited

U.S. PATENT DOCUMENTS

| | | | |
|---|---|---|---|
| 3,290,876 | 12/1986 | Ernst | 423/213.7 |
| 3,499,269 | 3/1970 | Bois | 55/309 |
| 3,931,050 | 1/1976 | Asano et al. | 423/213.5 |
| 4,003,854 | 1/1977 | Skvortsov et al. | 423/239 |
| 4,072,471 | 2/1978 | Morgan, Jr. et al. | 422/171 |
| 4,118,199 | 10/1978 | Volker et al. | 422/171 |
| 4,285,193 | 8/1981 | Shaw et al. | 60/39.06 |
| 4,303,552 | 12/1981 | Ernest et al. | 252/465 |
| 4,351,811 | 9/1982 | Matsuda et al. | 423/239 |
| 4,451,441 | 5/1984 | Ernest et al. | 423/213.2 |
| 4,455,393 | 6/1984 | Domesle et al. | 502/347 |
| 4,477,417 | 10/1984 | Domesle et al. | 423/213.2 |
| 4,480,050 | 10/1984 | Brennan | 423/213.5 |
| 4,510,265 | 4/1985 | Hartwig | 423/215.5 |
| 4,515,758 | 5/1985 | Domesle et al. | 423/213.2 |

FOREIGN PATENT DOCUMENTS

| | | | |
|---|---|---|---|
| 1337630 | 4/1963 | France | 423/213.2 |
| 413744 | 7/1934 | United Kingdom | 423/213.2 |
| 1014498 | 12/1965 | United Kingdom | 423/213.2 |

OTHER PUBLICATIONS

Chemistry, Bailer, Jr. et al., Academic Press, 1978, pp. 420–421.

Primary Examiner—Robert L. Stoll
Assistant Examiner—Jeffrey Edwin Russel
Attorney, Agent, or Firm—Beveridge, DeGrandi & Weilacher

[57] ABSTRACT

An apparatus for cleaning the exhaust gases of diesel engines, and especially for removal of soot particulates, utilizing series connected filter elements installed in the cross section of a housing traversed by the exhaust gas, wherein at least one filter element carrying a catalyst that lowers the ignition temperature of the soot and assists in soot burn off alternates several times with at least one filter element carrying a catalyst that assists the combustion of gaseous pollutants.

16 Claims, 5 Drawing Sheets

METHOD FOR THE PURIFICATION OF EXHAUST GAS FROM DIESEL MOTORS

REFERENCE TO RELATED APPLICATIONS

This is a continuation of application Ser. No. 06/914,416 filed Oct. 2, 1986 now abandoned which is divisional of application Ser. No. 06/703,005 filed Feb. 19, 1985 now abandoned—both of which are relied on and incorporated by reference.

The present invention relates to an apparatus for cleaning the exhaust gases of diesel engines with respect to oxidizable solid, liquid and gaseous pollutants.

In addition to the pollutants found in the exhaust of Otto (internal combustion) engines, such as hydrocarbons, oxides of nitrogen and CO, diesel engines because of their mode of operation also emit soot particulates or extremely fine condensation droplets or a conglomerate of both ("particulates"). These particulates, hereinafter simply referred to as "diesel soot" or simply as "soot" are very rich in condensable, polynuclear hydrocarbons, some of which have been found to be carcinogenic.

In the United States, for example, in order to reduce the particulate emission levels, a limit has been set for the amounts of particulates in the exhaust gas. Thus, in California, starting with the model year 1986, particulate emission levels shall not exceed the limiting value of 0.2 g/mile. This cannot be accomplished through measures taken inside the engine alone. Therefore, exhaust gas aftertreatment devices must be used to provide for a technical solution to this problem.

Proposals have been made in the past to capture diesel soot in filters and to regenerate the latter by periodically buring the trapped paticulates. As could be determined by thermogravimetric analysis of particulates in the filter, the mode of operation of a diesel engine affects the composition of the diesel soot trapped in filters. The soot, at the relatively high exhaust gas temperatures when the load carried by the engine is high, contains primarily carbon particulates, while at the relatively low exhaust gas temperatures when the engine load is low, still contains considerable amounts of volatilizable matter in addition to the carbon particulates. Therefore, when the engine load is high, less diesel soot is filtered off from a specified exhaust gas volume, while volatile diesel soot constituents pass through the hot filter in gaseous form.

Under normal operating conditions, the temperatures of diesel exhaust gases are not sufficiently high to burn off the trapped soot. To accomplish this, at least 500° to 600° C. is required, depending on the soot composition which is dependent upon the engine or the load. Therefore, a timely increase of the exhaust gas temperature must be ensured for the regeneration of the filter in order to avoid an excessive accumulation of soot and, thereby, an increase of the exhaust gas back pressure which ultimately leads to choking. This can, for example, be effected by periodically enriching the air-fuel mixture formed in the engine and by generating higher exhaust gas temperature.

Another possibility provides for the installatinon of a burner in the exhaust gas system of the filter which is ignited as necessary and heats the filter to the temperature required for burning off the soot.

However, these approaches increase the fuel consumption and hence diminish to a certain degree an important advantage of the diesel engine. German Pat. No. 31 41 713 A 1 and German patent application P No. 32 32 729.3 previously proposed the lowering of the ignition temperature of diesel engine by providing a soot filter or soot trap with special catalysts so that a substantial reduction in the fuel consumption can be achieved during the regeneration phase of the filter. A catalyst suitable for this purpose is, for example, silver vanadate or perrhenate. The catalyst, optionally in combination with a carrier material, can be applied to a filter element which, in addition to its own function, performs the additional function of a structural reinforcer for the catalyst. Filter systems that are of particular interest are, for example, a packing consisting of temperature resistant metal or mineral wool, a filter element disclosed in German Pat. No. 29 44 841 A 1 or in German Pat. No. 29 51 316 A 1, or a ceramic monolith traversed by parallel flow passages in which any one time a passage, which is open on an end face, is closed on the other end face so that macroporously designed passage walls act as filter surfaces.

A characteristic shared by the filter systems equipped with a catalyst as described above is that they collect on their filter surfaces, during the so called soot phase, the soot, or to be more precise, the exhaust gas portion that can be filtered off after the particular operating condition until, with the occurrence of temperature peaks in the exhaust gas, ignition with the subsequent burn off phase occurs. The temperature peaks can be deliberately brought about, e.g. by enriching the mixture.

The ignition temperatures are lowered by the catalytic activation with an oxygen content of the exhaust gas of approximately 2–14 percent by volume, usually be about 50°–80° C., and a complete cleaning of the filter, heretofore referred to as "complete soot burn off" is achieved.

It has bee observed, however, that with the ignition temperature lowering catalysts complete oxidation cannot be achieved of the onrushing volatile diesel soot particulates or of the diesel soot collected and ignited at the filter during the soot loading phase and hydrocarbons that may be adsorbed by the soot particulates, usually multinuclear aromatics, during burn off can be volatilized or possibly even split into partly volatile products, or oxidized incompletely.

As a result, there may be observed not only a considerable increase in the emission of carbon monoxide and, possibly, even of hydrocarbons that are volatile at normal outside temperature beyond the emission level of the diesel engine which, in and of itself, is deemed favorable, but also hydrocarbons that are evaporated during the "turn off" and are nonvolatile at normal outside temperature pass through the filter in gaseous form, then condense upon entering the ambient air and thereby increase to an undesirable degree the particulate emission level. The burning process can be noticed by a sudden drop of the exhaust gas back pressure upstrem of the filter.

According to German Patent Application P No. 32 32 729.3, attempts have been made to solve this problem by coating the filter units described therein, which operate according to the dual stage soot loading and burning off cycle on the side of their exhaust gas inlet, with an ignition catalyst and, on the side of their exhaust gas outlet, with a noble metal catalyst.

However, the design of these single unit systems which are provided, on the upstream side of a filter membrane, with the ignition catalyst and, on their downstream side, with the noble metal catalyst, had to be improved because it is only with difficulty and with an enormous amount of time that the two different layers of catalyst can be deposited on the front and rear sides of the membrane or membranes of these filters. In addition, they are traversed only once by the exhaust gas to be purified, so that soot retention as well as afterburning of volatile pollutants is limited and, from the thermal point of view, the boundary surface between the two types of catalyst is heavily charged.

Therefore, the object of the invention is to provide for each of the two types of catalyst an independent filter element as a structural reinforcer and to connect the different activated separate elements in the form of a repeating sequence.

Accordingly, the invention relates to an apparatus for purifying the exhaust gases of diesel engines with a filter installed in the cross section of a housing traversed by the exhaust gas and provided with a catalyst that lowers the ignition temperature of filtered out soot particulates and assists in its burn off, as well as with a catalyst that assists the combustion of gaseous pollutants. In the housing, the filters are installed in series for trapping the soot particulates, either directly in contact or spaced a distance from each other. One filter element A carries the catalyst that lowers the ignition temperature of the soot and assists in its burn off and at least one filter element B carries the catalyst that assists in the combustion of gaseous pollutants, and these alternate several times with one another.

In order to protect the catalyst that assists the combustion of gaseous pollutants from inactivation caused by trapped particulates, a preferred embodiment of the invention provides for a series of alternating separate filter elements or groups of filter elements of the species A and B that begins in the direction of the exhaust gas stream with a species A and terminates with a species B. This embodiment does not rule out a reversed arrangement.

As a general rule, filter elements of the species A or B are used in the same geometric configuration. However, with an appropriate design of the housing, elements with a different geometric configuration can also be placed one behind the other. It was found to be beneficial to space filter elements A or B with the same geometric configuration a distance from one another which distance is, at most, twice the thickness of the filter element. As a result, as the exhaust gas issues from a given filter element, it is vortexed anew into the interspace, thereby advantageously affecting the conversion of the pollutants.

Due to the cascade type arrangement of several filter elements of the different species, the filtration and conversion of the particulates and the afterburning of existing or formed gaseous pollutants will not only be repeated several times, but the heat generated in the front sections of the exhaust gas cleaning device will also be made use of in rear sections. This permits the reduction of the stream resistance of the filter and, in the case of medium and relatively high operating loads, will produce a practically continuous conversion of the particulates on their way through the exhaust gas cleaning apparatus, so that a distinct soot loading phase can be dispensed with.

Filter elements that may be generally used for purposes of the invention are: ceramic disks sintered into open porosity; disks from pressed ceramic fibers, particularly fibers of $Al_2O_3$, $SiO_2$, aluminium silicate, or $ZrO_2$; disks formed of sintered metal; disks formed of pressed steel wool; packed beds of temperature-resistant ceramic or metallic material. All such materials are known in the art.

Toward this end, a flat disk from compacted wire cloth surrounded, if desired, by a metal enclosure by way of holding fixture, can be used as an extremely suitable filter element for a housing having any cross section, preferably round. The disk can be obtained by axially pressing a hose braided in several layers from an endless wire which is resistant to high temperatures and immune to corrosion. These filter elements are described in detail in German Pat. No. 32 03 237 A 1 and are thus known in the art.

In another embodiment of the invention which is also of considerable significance, the catalyst for filter element A, which is to assist the ignition and burn off of the particulates, consists of one or more of the following compositions (a) to (e) that have been found to be exceedingly effective for this special case of heterogeneous catalysis of the conversion of a particle shaped material with a gaseous oxidizing agent:

(a) lithium oxide,
(b) vanadium pentoxide,
(c) vanadium pentoxide plus an oxide of one or more of the following elements:
Li, Na, K, Rb, Cs;
Mg, Ca, Sr, Ba;
B, Al;
Si, Sn;
Sb, Bi;
Cu, Ag;
Zn;
Sc, Y, La, Ce, Pr, Nd, Tb;
Ti, Zr, Hf;
Nb;
Cr, Mo, W;
Mn, Re;
Fe, Co, Ni,
wherein the oxide admixture is preferably 1–30 percent by weight referred to $V_2O_5$,
(d) vanadate of one or more the metals listed under (c) above, and
(e) perrhenate, preferably Li, K, Ag, V.

This type of catalyst can be combined with a temperature resistant carrier material, the latter being mixed with the catalyst or being applied to the filter element, which serves as a base for the catalyst. Suitable carrier materials that can be employed separately or in mixtures are for example, MgO, $Al_2O_3$, particularly $\gamma\text{-}Al_2O_3$, $CeO_2$, $SnO_2$, $TiO_2$, $ZrO_2$, $HfO_2$, $ThO_2$, $Nb_2O_5$, $WO_3$, magnesium silicate, aluminum silicate and/or magnesium titanate or combinations thereof. These substances are known in the art and any suitable one may be used as a carrier.

Of particular significance is the choice of the material for the filter element A. It has been found that materials with chemical compositions (in percentage by weight), such as the following may be used:

|     | C | Mn | P | S | Cr | Si | V | Co | Al | Zr | Y |
|-----|---|----|----|----|----|----|----|----|----|----|----|
| (a) | 0.09 | 0.29 | 0.02 | 0.02 | 12.93 | 0.22 | 0.03 | 0.48 | 5.05 | 0.15 | 0 |

| | C | Mn | P | S | Cr | Si | V | Co | Al | Zr | Y |
|---|---|---|---|---|---|---|---|---|---|---|---|
| (b) | 0.11 | 0.30 | 0.02 | 0.02 | 13.17 | 0.22 | 0.07 | 0.56 | 4.92 | 0.23 | 0 |
| (c) | 0.03 | 0.31 | 0.02 | 0.00 | 20.0 | 0.44 | 0.12 | 0.48 | 4.3 or also 5.3 | 0.12 | 0 |
| (d) | 0.17 | 0.28 | 0.02 | 0.02 | 15.39 | 0.32 | 0.02 | 0.34 | 5.53 | 0.005 | 0.45 |

Materials (a) and (b) correspond to material 1.4725 (DIN) and material (c) corresponds to material 1.4767 (DIN). Further, iron alloys with a high nickel percentage, iron alloys with a nickel coating, as well iron alloys coated with aluminum or with an aluminum diffusion layer are particularly suitable. Such substances are known in the art and any suitable ones may be used for purposes of the invention.

One or more elements of the platinum group, optionally together with one or more base metals, can be used as the catalyst for the filter element B, in combination with a temperature resistant carrier material, preferably MgO, $Al_2O_3$, particularly $\gamma$-$Al_2O_3$, $CeO_2$, $SiO_2$, $SnO_2$, $TiO_2$, $ZrO_2$, $HfO_2$, $ThO_2$, $Nb_2O_5$, $WO_3$, magnesium silicate, aluminum silicate and/or magnesium titanate or combinations thereof, the carrier material being mixed either with the catalyst or applied to the filter element and serves as a base for the catalyst.

As a material for the filter element B, an aluminum containing chromium steel is preferred which can be coated with an adhesive aluminum oxide layer by tempering in air at temperatures of from 800° to 1300° C. This is a material known in the art. Carrier material and catalytically active constituents can then be applied to this anchoring layer simulaneously or one after the other according to methods known in the art.

BRIEF DESCRIPTION OF THE DRAWINGS

The invention will now be described with reference to illustrative specific embodiments in conjunction with the accompanying drawing wherein.

In carrying out the specific examples, an exhaust gas filter consisting of a cylindrical sheet metal housing formed of chromium nickel steel was used in each case. This housing was closed on the front side with a cover that tapers conically toward a connecting piece for the exhaust gas inlet or outlet and in each case contained in the cylindrical inner space, a series of 12 filter elements, one after the other composed of disks made from braided wire cloth as disclosed in German Pat. No. 32 03 237 A 1 (Knecht Filerwerke GmbH, Stuttgart), wherein these filter elements were in tight fitting engagement with their peripheries against the housing wall.

The disk made of braided wire cloth corresponds to the material described in 1.4767 DIN (German Industrial Standards) has a composition in percentage by weight of C 0.03, Mn 0.31, P 0.02, S 0.00, Cr 20.0, Si 0.44, V 0.12, Co 0.48, Al 4.8 and Zr 0.12 with a diameter of 72 mm, a thickness of 3.2 mm, and weighed 10.2 g. It was fabricated by pressing with a high degree of precision a hose braided in several layers from a wire, 75 m long and 0.15 mm thick.

To fabricate filter elements of the species A, the disks of braided wire cloth were first pretempered for 1 hour at 700° C., then rolled at room temperature in a powdery mixture consisting of 99 parts by weight vanadium pentoxide (purity 97%) and 5 parts by weight silver vanadate, after which the resultant coating was treated for 30 minutes at 700° C. The result was a sticky, closed catalyst layer, 1–10 $\mu$m thick, (catalyst material per disk is approximately 2 g).

To fabricate filter elements of the species B, 9 g $\gamma$-$Al_2O_3$ and 0.07 g, platinum was applied to each disk. The aluminum oxide was applied by dipping the disk into a 30 percent by weight aqueous aluminum oxide dispersion, air-blowing and drying at 200° C.; these operations being repeated 3 to 6 times. The catalyst layer was then tempered for 120 minutes at 700° C. The platinum was applied by repeatedly impregnating the $Al_2O_3$ coated disk from braided wire with an aqueous solution of $[Pt(NH_2)_4]$ $(OH)_2$ and drying at 200° C., as well as subsequent 1-hour calcinating at 500° C. and, finally, a 2-hour reduction treatment in a forming gas (composition: 95 percent by volume $N_2$ +5 percent by volume $H_2$) at 550° C.

Figure 1:
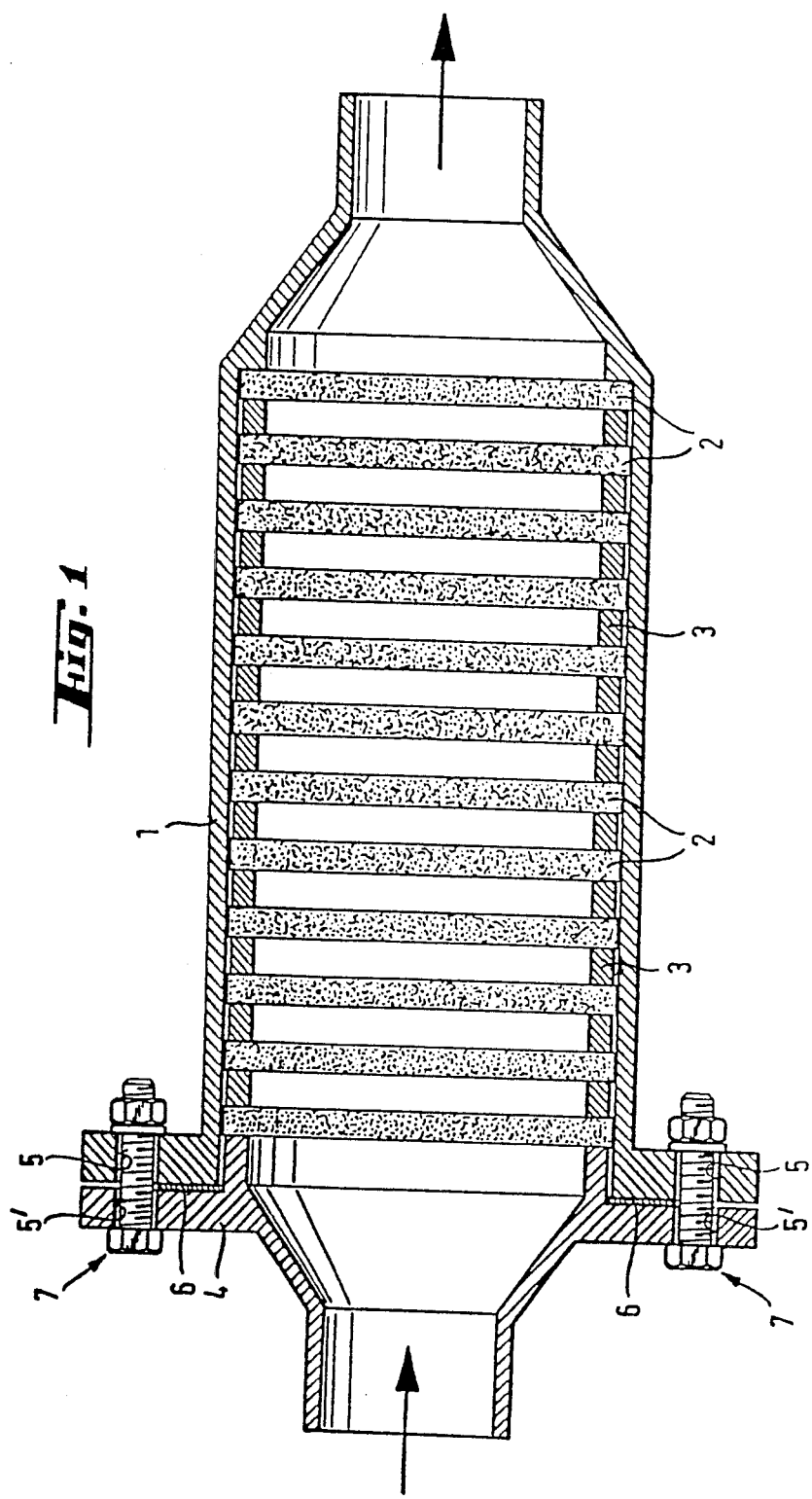
FIG. 1 shows an exhaust gas filter containing 12 filter elements.

For the individual tests, 12 filter elements were placed in uncoated form, or coated with the species A or B, in the housing depicted in FIG. 1.

As shown in FIG. 1 the test converter used in the examples consisted of a cylindrical housing part 1 formed of material described in DIN No. 1.4571 which, on the end of the upstream side, has a flange that projects perpendicularly to the longitudinal axis of the housing with six equally spaced holes 5 to receive a screw bolt connection 7.

At the end of the downstream side, the housing is provided with a cone that tapers toward a cylindrical outlet pipe connection for the exhaust gas to which the rear section of the exhaust pipe is attached.

Twelve of the above disk shaped filter elements 2 of the desired species are inserted in the housing part 1 in cascade fashion and spaced a distance of 6 mm from one another. Their peripheries are in tight fitting engagement with the housing jacket. The distances between the filter disks are maintained by inserting intermediate rings 3 made from DIN 1.4571 material. The spacing serve to improve the mixing of the gases.

On the upstream side of the converter, the housing part 1 is connected to an upstream head 4 made from the same material. The upstream head consists of a ring fitted into the inner jacket of the housing with allowance for sliding therein (its length corresponds substantially to the thickness of the housing flange). This ring is mounted with a cone that tapers toward the inlet pipe connection for the exhaust gas. The exhaust pipe originating from the engine is plugged into the exhaust gas inlet pipe connection. On the cone of the heat portion, a flange mating with the flange of the housing 1 is provided with six holes 5' to receive the so called screw bolt connection 7. A flange of the housing part 1 is mounted in such a way that its sealing surface lies in the plane going through the ring shoulder on the cone. A sealing disk 6 made from asbestos (Montanit) is provided between the two flanges.

By tightening the screw bolts 7, the filter elements 2 are compressed via the intermediate rings 3. As a result, their peripheries are in even closer fitting engagement with the inner jacket of the housing, with the result that a bypass of the exhaust gas is avoided and all the exhaust gas is forced to pass through all the filter elements.

The installed exhaust gas filter is built into the exhaust pipe of a diesel engine provided with a water-eddy-current brake with an electrical speed and load regulating device:
VW-4-cylinder diesel engine
Power: 40 kW
Stroke volume: 1500 cm$^3$
Maximum speed (without load): 5,550 rpm
No-load speed: 825 rpm.

The exhaust gas analysis includes a determination of HC, CO, NO$_x$ upstream and downstream of the exhaust gas filter as well as a carbon measurement downstream of the filter by means of an opacimeter (turbidimeter).

The exhaust gas back pressure (loss of pressure) upstream of the filter is measured with a box contact pressure gauge and the exhaust gas temperature upstream of the filter with a Ni-Cr-Ni thermocouple.

For the tests described in the examples, the following measuring procedure was carried out by means of the testing equipment discussed earlier:

The diesel engine is set at a constant load and rate and operated under these conditions until a load pressure of 150 mbar is reached at the filter (collecting phase). The time required for this, as well as other parameters, is continually logged by a 6-channel printer.

Prior to the start of the actual test cycle, the carbon ignition temperature was determined by gradually increasing the load from a loading pressure of 150 mbar until an equilibrium pressure (ignition pressure $P_i$) is attained. The ignition temperature $T_i$ is defined as the exhaust gas at which, under constantly maintained engine operating conditions, the pressure increases no further; i.e., until the soot being deposited at the filter or arriving there is immediately burned off anew.

After operating 5 minutes under constant conditions, the engine load is raised until the regeneration temperature lying above $T_i$ is reached. Then, the deposited soot starts to burn and the pressure upstream of the filter diminishes rapidly until it reaches a limiting value corresonding to the degree of regeneration which varies, depending on the filter type or system. After 20 minutes the regeneration is deemed termination and the cycle repeated.

The time from the start of the regeneration until attainment of the end pressure for the evaluation of the catalyst layer(s). This indicates the soot burn off speed. A mean value resulting from the sum of cycles is used for the evaluation.

In addition to the soot ignition temperature, the trapping of the particulates is also determined by means of a turbidimeter (opacimeter) downstream of the filter unit (test converter).

EXAMPLE 1

The example describes the course of the particulate collecting and burning off phase in a series of 12 filter elements that are not coated with a catalyst.

Twelve filter elements designed in the manner mentioned above, without catalytic coating, were loaded at the testing equipment with diesel exhaust gas in the converter depicted in FIG. 1.

Figure 2:
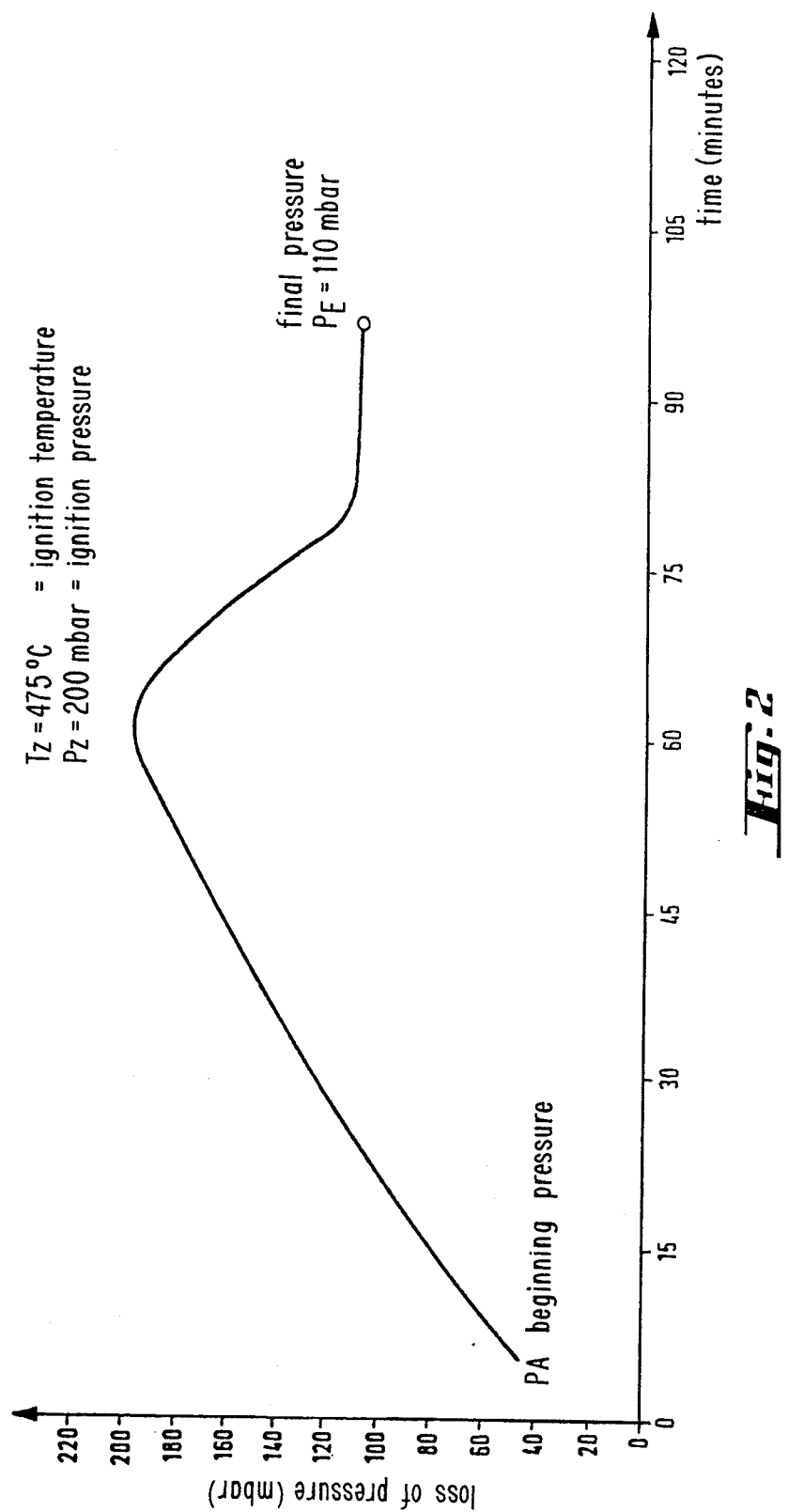
FIG. 2 shows the curve of the soot collecting and burning phase in a series of 12 uncoated filter elements.

The measured data are apparent from the table shown after the examples and from FIG. 2.

In the so called collecting phase, which occurs at a constant rate and engine load, the filter elements are loaded with the soot particulates contained in the exhaust gas, as a result of which the loss of pressure (or the back pressure of the exhaust gas) in the system increases. When the engine load is increased, equilibrium pressure $P_i$ and equilibrium temperature $T_i$ gradually set in.

When the engine load is increased further, the temperature of the exhaust gas rises, thereby accelerating the burn off of the soot particulates. As a result, the curve indicating the loss of pressure drops relatively steeply and thereafter runs substantially horizontally until the end pressure $P_E$ is reached.

The shape of the pressure loss curve depicted in FIG. 2 shows that ignition temperature, ignition pressure and final pressure lie relatively high here. A conversion of volatile hydrocarbons and CO cannot be determined. In the filter, the initial particulate concentration is reduced by 74% through separation, corresponding to a particulate emission from the filter of 26% of the initial value.

EXAMPLE 2

This example shows the curve of soot collecting and burning off phase in a series of 12 filter element of the species A.

The filter elements were inserted in the converter and tested on the testing equipment. The measured data are shown in the table shown after the examples.

Figure 3:
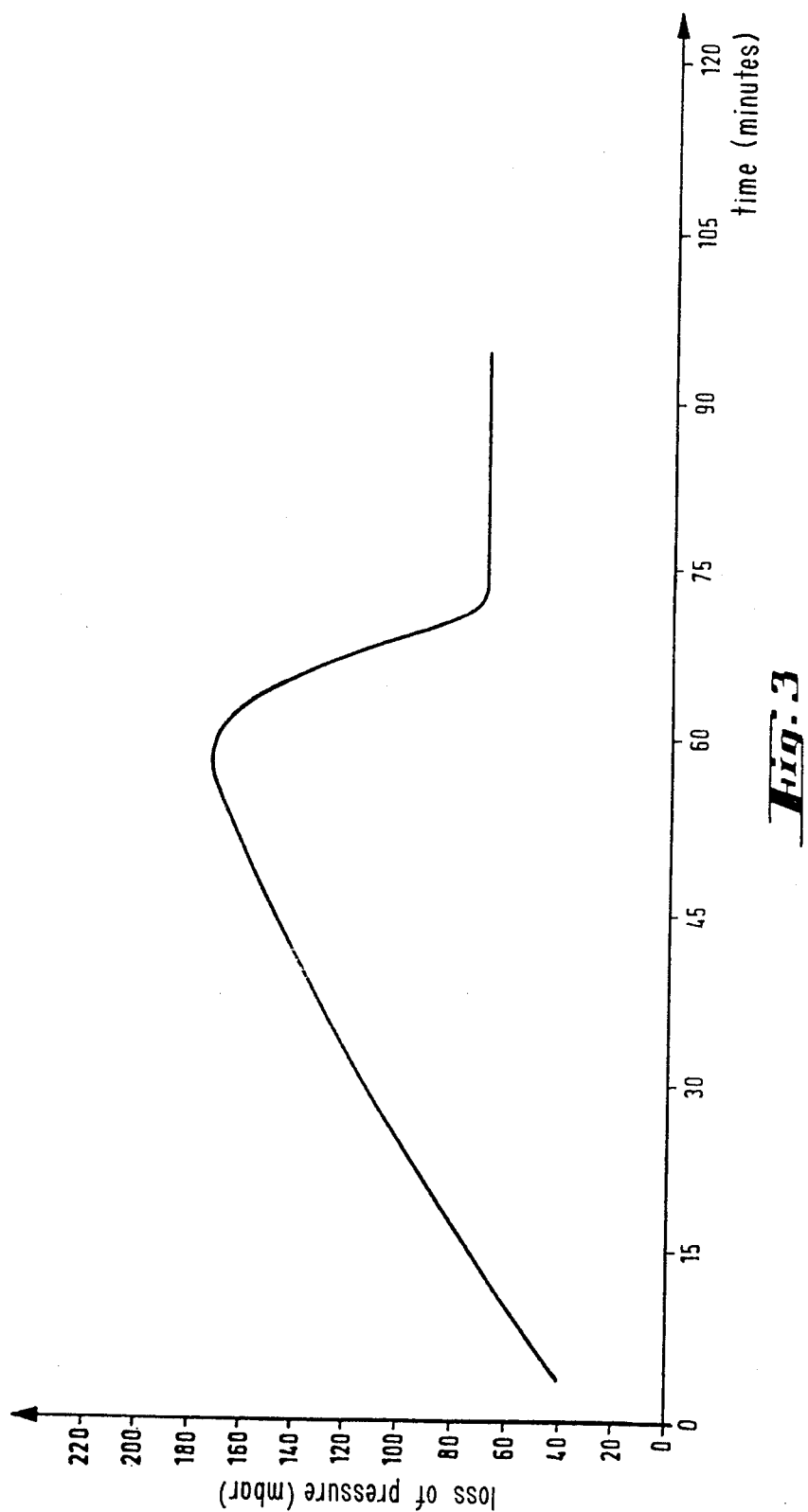
FIG. 3 shows the curve of the soot collecting and burning off phase in a series of 12 filter elements of the species A.

From this and from FIG. 3, it is apparent that particulate collecting phase, soot ignition and filter regeneration occur substantially as in Example 1, the difference being that in this case the ignition, due to the catalyst action, already sets in with a smaller loss of pressure and at a lower temperature and, hence, in a shorter time.

The filter was regenerated more fully, which is apparent from the attainment of an end pressure $P_E$, which is substantially lower compared to Example 1.

The hydrocarbon and CO conversion did not change (within the scope of the measuring accuracy) compared to Example 1, i.e. the ignition catalyst is unable to convert these materials.

The particulate reduction, expressed as a percentage, which is lower than in Example 1, is due to the catalyzed soot burn off which leads to a thinner filter coating of correspondingly poorer filtering ability.

EXAMPLE 3

This example shows the curve of the soot collecting and burning off phase in a series of 6 filter elements of the species A followed by a 6 filter elements of the species B.

Figure 4:
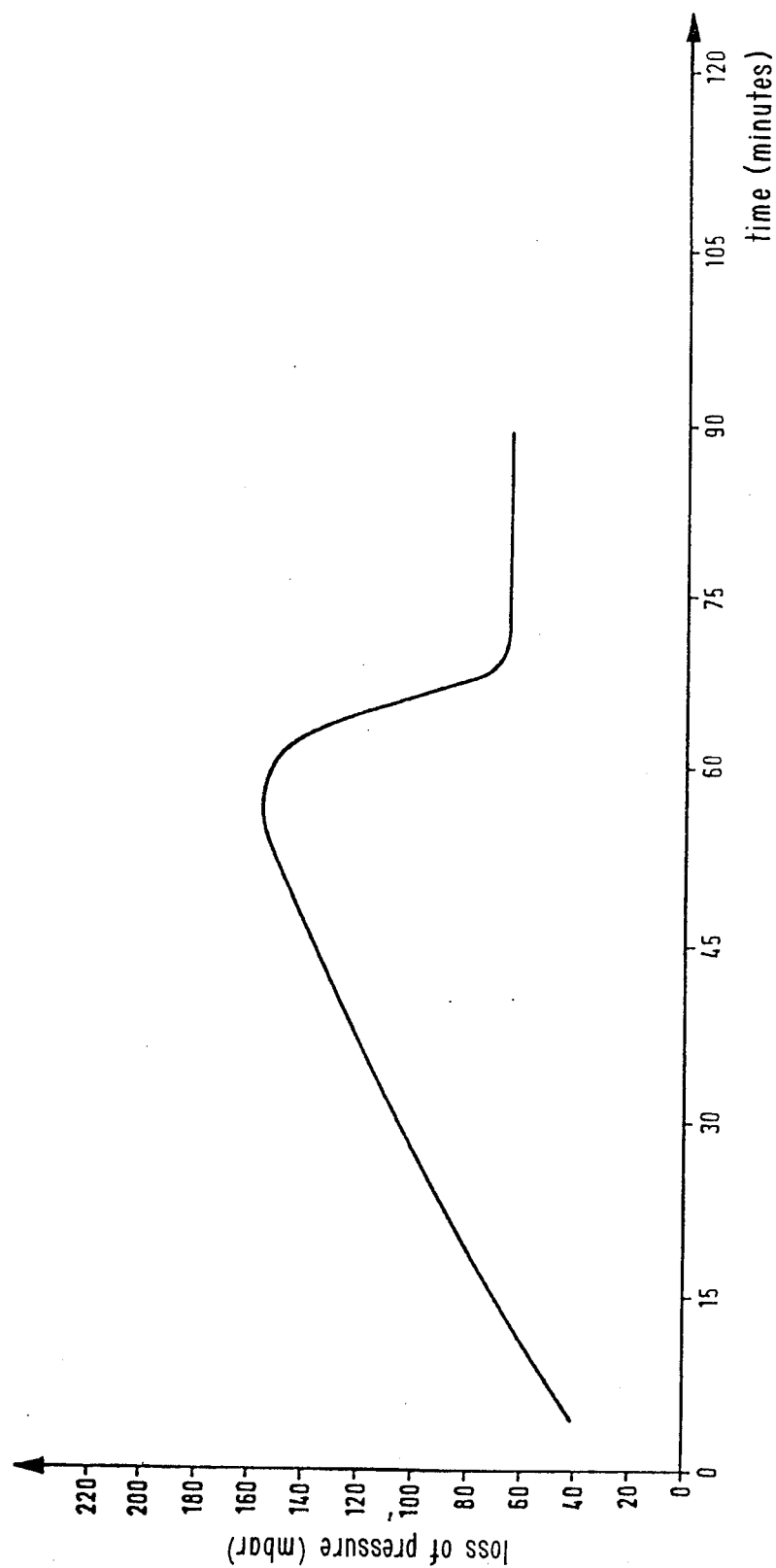
FIG. 4 shows the curve of the soot collecting and burning off phase in a series of 6 filter elements of the species A followed by 6 filter elements of the species B.

The filter elements of the species A, follwed by the filter element of the species B, were inserted in the converter and tested on the testing equipment. The measured data are apparent from the table shown after the examples and from FIG. 4.

It was found that the collecting and burning off phases had the same curves as in Examples 1 and 2, but with the difference that the soot ignition sets in with a still greater loss of pressure and at a still lower exhaust gas temperature.

At the end of the regeneration phase, a still lower end pressure $P_E$ was reached. Further, a considerable reduction in the CO and HC conversions could be accomplished with coincident use of filter elements of the species B. In addition, a slight improvement of the degree of filter action over Example 2 was achieved by combining the two species of filter elements.

EXAMPLE 4

This example described the course of the soot collecting and burning off phase when using 12 filter elements of the species A and B, with one element of the species A and one element of the species B alternating with one another.

The elements were inserted in the converter in the sequence A-B-A-B and the filter system was tested on the testing equipment. The measured data can be seen from the table shown after the examples and from FIG. 5.

Figure 5:
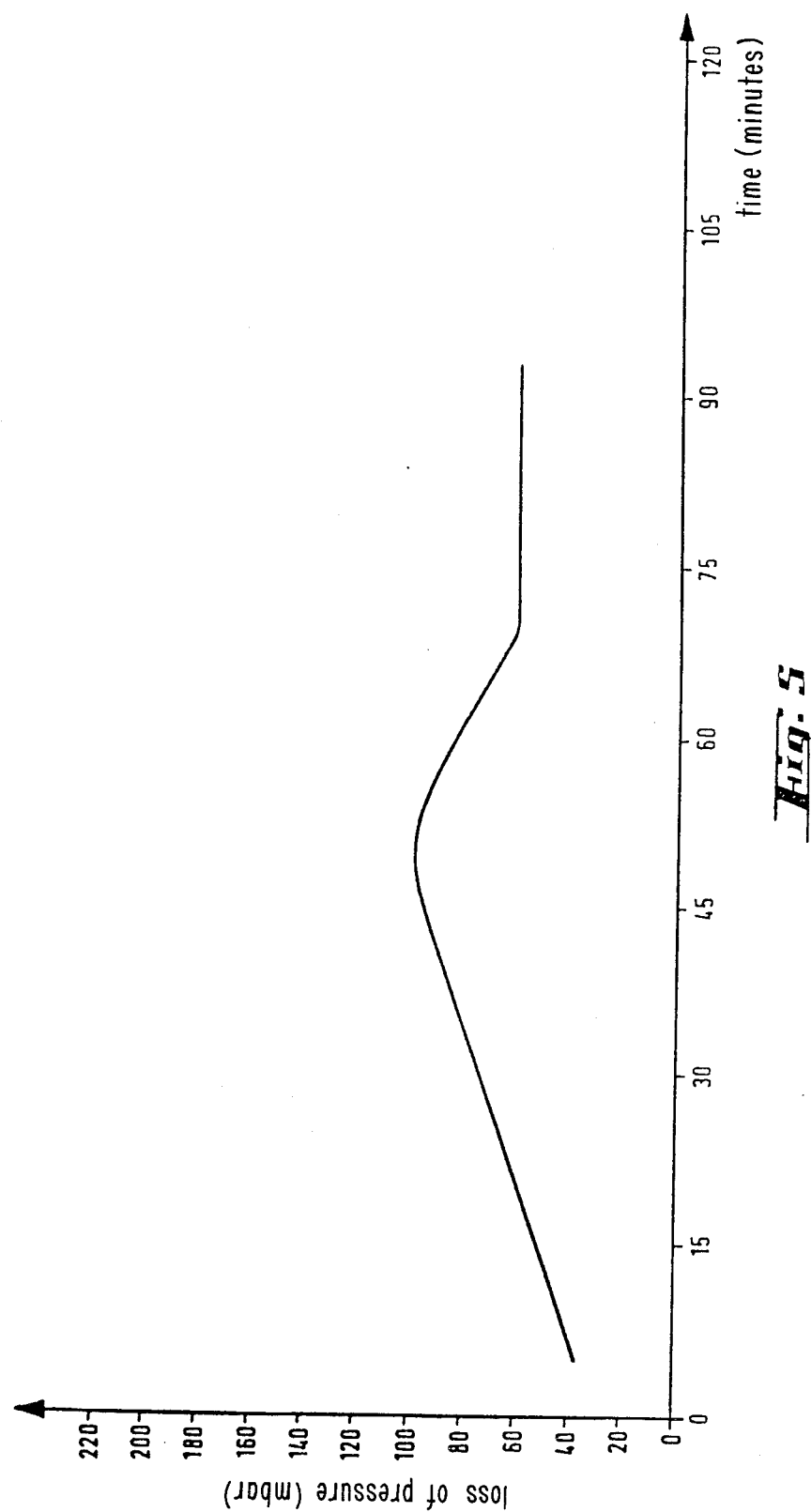
FIG. 5 shows the curve of the soot collecting and burning off phase in a series of 12 filter elements of species A and B, in which one element of the species B alternate with each other.

The shape of the curve depicted in FIG. 5 shows a substantially flatter rise in the loss of pressure throughout the operating time than in the preceding examples. In this case, the particulate burn off had already occurred at exhaust gas temperature when the load carried by the engine was small, a considerable portion of the onrushing soot particulates being burned off on the filter without substantial collection.

As a result, there is no longer a distinct carbon soot collecting phase here, which must be deemed a considerable advantage of the alternating A-B-A-B arrangement.

This examples shows that with an alternating an arrangement of filter elements of the species A and B one can obtain the lowest ignition temperatures, the smallest pressure increase and the greatest hydrocarbon and carbon monoxide conversion, as well as a further improvement of the degree of filtering action.

On balance, the examples show that both a series connection of groups of filter elements of the species A and B and an alternating arrangement A-B-A-B, etc. product considerable advantages over filter systems which either contain no catalyst or only one ignition catalyst for burning off the soot particulates. In both cases according to the invention, the loss of pressure caused by the filter unit can be made lower and the soot can already be burned off at lower engine loads.

For the practical application in a motor vehicle, the present invention means greater operating safety of the soot filtering device, reduced pollutant emission, and lesser fuel consumption of the engine. The specific example of the invention described in Example 4 is even superior to that of Example 3. However, the latter example is more effective than in systems in which parallel connected filter membranes carry on the upstream side the ignition catalyst and on the downstream side the afterburning catalyst for volatile or volatilized pollutants.

The special compositions of materials developed for the catalyst of the filter elements A provide a decisive precondition which can also be put to use independently in other circumstances to overcome the soot ignition and burn off problemsposed by the relatively cool exhaust gases of the diesel engines.

Further variations and modifications of the present invention will be apparent to those skilled in the art from the foregoing and are intended to be encompassed by the claims appended thereto.

The entire disclosure of German patent application P No. 34 07 172.5 of Feb. 28, 1984 is relied on and incorporated herein by reference.

We claim:

1. A method for cleaning diesel engine exhaust gases containing soot particles comprising passing said exhaust gases through a filter system installed in the cross section of the exhaust system traversed by the exhaust gases, said filter system including a series of filter elements for entrapping the soot particles and wherein said series of filters includes at least one first filter element carrying a first catalyst material that lowers the ignition temperature of the soot and assists in burn off of the soot and a second filter element carrying a second catalyst material that assists in the combustion of gaseous pollutants contained in said gases, said first and second catalyst materials having separate and distinct compositions and said first catalyst material carried by said first filter element in the sole catalyst material carried by said first filter and said second catalyst material carried by said second filter element is the sole catalyst material carried by said second filter;

arranging said at least one first and said at least one second filter element in a sequence which ensures that one filter carrying one of the two distinct catalyst compositions is between a pair of filters carrying the other of the two distinct catalyst compositions.

2. The method according to claim 1, wherein the exhaust gases are passed through a series of alternating separate filter elements of the type A and B arranged in the sequence ABAB, where type A carries the catalyst that lowers the ignition temperature of the soot and type B carries the catalyst which assists in combustion of gaseous pollutants.

3. The method according to claim 2, wherein the series of alternating separate filter elements of the type A and B is arranged beginning in the direction of the

TABLE

Measured Data Table Pertaining To The Examples

| Example | $P_i$ ignition pressure mbar | $T_i$ ignition temp. °C. | $P_E$ end pressure mbar | particulate reduction % | particulate emission % | exhaust gas conversion at 400° C. % | | |
|---|---|---|---|---|---|---|---|---|
| | | | | | | HC | CO | NO$_x$ |
| 1 (FIG. 2) | 200 | 475 | 110 | 74 | 26 | * | * | * |
| 2 (FIG. 3) | 175 | 408 | 70 | 63 | 37 | * | * | * |
| 3 (FIG. 4) | 157 | 375 | 65 | 65 | 35 | 72 | 70 | * |
| 4 (FIG. 5) | 100 | 350 | 60 | 68 | 32 | 87 | 87 | * |

*Values lie within the measuring accuracy, i.e. they are negligibly small exhaust gas stream with a type A and terminates with a type B.

4. The method according to claim 3 wherein said filter elements are positioned within a housing with the A catalyst consisting essentially of vanadium pentoxide plus silver vanadate and the B catalyst consisting essentially of gamma alumina plus platinum.

5. The method according to claim 2, wherein the catalyst for the filter element A is selected from the group consisting of:
    (a) lithium oxide,
    (b) vanadium pentoxide,
    (c) vanadium pentoxide plus an oxide of one or more of the elements:
        Li, Na, Rb, Cs;
        Mg, Ca, Sr, Ba;
        B, Al;
        Si, Sn;
        Sb, Bi;
        Cu, Ag;
        Zn;
        Sc, Y, La, Ce, Pr, Nd, Tb;
        Ti, Zr, Hf;
        Nb;
        Cr, Mo, W;
        Mn, Re;
    (d) vanadate of one or more of the metals listed under (c) for the oxide admixture, and
    (e) perrhenate.

6. The method according to claim 5, wherein the oxide admixture in (c) is 1-30% by weight based on $V_2O_5$ and the perrhenateine) is Li, K, Ag, or V.

7. The method according to claim 5, wherein the catalyst is combined with a temperature resistant carrier material, and the latter is mixed either with the catalyst or applied to the filter element and serves as a base for the catalyst.

8. The method according to claim 2, wherein there is used as catalyst for the filter element B one or more elements of the platinum group.

9. The method according to claim 8, wherein there is additionally present at least one base metal.

10. The method according to claim 8, wherein there is additionally present a temperature resistant carrier material.

11. The method according to claim 10, wherein the carrier is a member selected from the group consisting of $MgO$, $Al_2O_3$, $CeO_2$, $SiO_2$, $SnO_2$, $TiO_2$, $ZrO_2$, $HfO_2$, $ThO_2$, $Nb_2O_5$, $WO_3$, magnesium silicate, aluminum silicate and/or magnesium titanate and combinations thereof, and the carrier is mixed either with the catalyst or applied to the filter and serves as a base for the catalyst.

12. The method according to claim 1, wherein the filter elements are of the same geometric configuration and are spaced apart one from another at a distance of up to twice the thickness of a filter element.

13. The method according to claim 1, wherein the filter element is a flat disk.

14. The method according to claim 13, wherein said flat disk is surrounded by a metal enclosure by way of holding fixture and is made of a wire cloth that has been compacted.

15. The method according to claim 1, wherein the filter element is a flat disk which is surrounded by a metal enclosure by way of holding fixture and is made of a wire cloth that has been compacted.

16. The method according to claim 15, wherein said disk is made from a hose braided in several layers from an "endless" wire which is resitant to high temperatures and immune to corrosion encountered in the diesel exhaust gas purification.

* * * * *